(12) United States Patent
Avila et al.

(10) Patent No.: US 10,976,528 B2
(45) Date of Patent: Apr. 13, 2021

(54) ANAMORPHIC REFRACTIVE OBJECTIVE LENS ASSEMBLY

(71) Applicant: RAYTHEON COMPANY, Waltham, MA (US)

(72) Inventors: Marco A. Avila, McKinney, TX (US); Douglas J. Hartnett, The Colony, TX (US); Mark Noethen, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 143 days.

(21) Appl. No.: 16/290,435

(22) Filed: Mar. 1, 2019

(65) Prior Publication Data

US 2019/0196159 A1 Jun. 27, 2019

Related U.S. Application Data

(62) Division of application No. 15/626,965, filed on Jun. 19, 2017, now Pat. No. 10,281,694.

(51) Int. Cl.
*G02B 13/08* (2006.01)
*G02B 13/00* (2006.01)
(Continued)

(52) U.S. Cl.
CPC .............. *G02B 13/08* (2013.01); *G02B 7/028* (2013.01); *G02B 13/0045* (2013.01);
(Continued)

(58) Field of Classification Search
CPC ........ G02B 13/08; G02B 13/10; G02B 13/12; G02B 13/14; G02B 13/0095;
(Continued)

(56) References Cited

U.S. PATENT DOCUMENTS

| 6,181,482 B1 | 1/2001 | Grafton |
| 6,310,731 B1 | 10/2001 | Wartmann et al. |

(Continued)

FOREIGN PATENT DOCUMENTS

| FR | 3032039 A1 | 7/2016 |
| GB | 2244817 A | 12/1991 |

OTHER PUBLICATIONS

Machine English language translation of Rollin et al. Jul. 29, 2016, Thales SA, FR 3032039 (Year: 2016).*
(Continued)

*Primary Examiner* — Marin Pichler
(74) *Attorney, Agent, or Firm* — Lando & Anastasi, LLP

(57) ABSTRACT

Aspects and embodiments are generally directed to compact anamorphic refractive objective lens assemblies. In one example, a refractive objective lens assembly includes a passively athermal anamorphic lens group including at least a first cylindrical lens having a surface optically powered in a first dimension, the first anamorphic lens group positioned to receive thermal infrared radiation, a focus cell positioned to receive the radiation from the anamorphic lens group, the focus cell including a first group of lenses each having a rotationally symmetric surface optically powered in the first dimension and a second dimension orthogonal to the first dimension, a relay lens group positioned receive the radiation from the focus cell, the relay lens group including a second group of lenses each having a rotationally symmetric surface optically powered in both the first and second dimensions, and a dewar assembly including a cold stop and an optical detector.

7 Claims, 4 Drawing Sheets

(51) Int. Cl.
*G02B 13/14* (2006.01)
*G02B 7/02* (2021.01)
*G02B 27/09* (2006.01)
*G02B 1/00* (2006.01)

(52) U.S. Cl.
CPC ......... *G02B 13/0095* (2013.01); *G02B 13/14* (2013.01); *G02B 27/0911* (2013.01); *G02B 1/00* (2013.01)

(58) Field of Classification Search
CPC .. G02B 13/0045; G02B 1/00; G02B 27/0911; G02B 7/028; G02B 17/008
USPC .................................................. 359/668, 710
See application file for complete search history.

(56) References Cited

U.S. PATENT DOCUMENTS

| | | |
|---|---|---|
| 6,512,636 B2 | 1/2003 | Schauss |
| 7,095,563 B2 | 8/2006 | Nurishi |
| 7,289,272 B2 | 10/2007 | Bowron et al. |
| 8,274,734 B2 | 9/2012 | Cook |
| 2006/0176580 A1 | 8/2006 | Kirkham |
| 2012/0057223 A1 | 3/2012 | Cook |
| 2013/0187047 A1 | 7/2013 | Cook |

OTHER PUBLICATIONS

Invitation to Pay Additional Fees and Partial Search Report in application No. PCT/US2018/028345 dated Jul. 16, 2018.
International Search Report and Written Opinion in Application No. PCT/US2018/028345.

* cited by examiner

ANAMORPHIC REFRACTIVE OBJECTIVE LENS ASSEMBLY

CROSS REFERENCE TO RELATED APPLICATIONS

This application claims priority under 35 U.S.C. § 121 as a division of U.S. patent application Ser. No. 15/626,965, titled "ANAMORPHIC REFRACTIVE OBJECTIVE LENS ASSEMBLY," filed Jun. 19, 2017, which is incorporated by reference herein in its entirety for all purposes.

BACKGROUND

Anamorphic lenses are typically used in cinema projection to convert between an aspect ratio of a native format and an aspect ratio of an on-screen projection format. In cinema projection, the aspect ratio of the on-screen projection is defined as the ratio of the width to the height of the projected image as seen on the screen. The most common aspect ratios are the conventional 1.85:1 "flat" image and the 2.35:1 "scope" image. Even though there are a variety of aspect ratios in use, often the stored native format may have an aspect ratio different from that of the on-screen projected image.

Accordingly, to accomplish the conversion between the aspect ratio of the stored native format and the aspect ratio of the on-screen projected format, the image may be projected through the anamorphic lens. The anamorphic lens enlarges the image along a first axis to a different extent than along a second perpendicular axis. That is, the recorded image may be asymmetrically stretched by the anamorphic lens to achieve a desired on-screen format. Thus, for example, a 1.33:1 native format may be projected in a 1.85:1 on-screen format.

SUMMARY OF THE INVENTION

Aspects and examples are generally directed to a compact anamorphic refractive objective lens assembly for imaging within the thermal infrared spectrum. Examples of the refractive objective lens assembly described herein have a reduced total length for a given anamorphic ratio and a given focal length when compared to typical anamorphic lens assemblies. According to certain examples, the refractive objective lens assembly includes a passively athermal anamorphic lens group that maintains a focus of the objective lens assembly over a wide range of temperatures and operating conditions. As a result of the reduced size and weight, and improved temperature insensitivity of the described refractive objective lens assembly, examples may be incorporated within aerial and other mobile imaging systems that are designed to perform wide area surveillance (WAS) imaging.

According to an aspect, provided is a refractive objective lens assembly. In one example, the refractive objective lens assembly comprises a passively athermal anamorphic lens group including at least a first cylindrical lens having a surface optically powered in a first dimension, the first anamorphic lens group being positioned to receive thermal infrared radiation along an optical path, a focus cell positioned along the optical path to receive the thermal infrared radiation from the anamorphic lens group, the focus cell including a first group of lenses each having a rotationally symmetric surface optically powered in both the first dimension and a second dimension orthogonal to the first dimension, a relay lens group positioned along the optical path to receive the thermal infrared radiation from the focus cell, the relay lens group including a second group of lenses each having a rotationally symmetric surface optically powered in both the first dimension and the second dimension, and a dewar assembly positioned along the optical path, the dewar assembly including a cold stop and an optical detector, the cold stop being positioned to receive the thermal infrared radiation from the relay lens group and to direct the thermal infrared radiation to the optical detector.

According to various examples, the refractive objective lens assembly further comprises a fold mirror interposed between the focus cell and the relay lens group and positioned to direct the thermal infrared radiation from the focus cell to the relay lens group. In some examples, the anamorphic lens group further includes a second cylindrical lens having a surface optically powered in the first dimension, and a third cylindrical lens having a surface optically powered in the first dimension. In further examples, the refractive objective lens assembly further comprises a fourth cylindrical lens having a surface optically powered in the first dimension, the fourth cylindrical lens interposed between the fold mirror and the relay lens group.

In some examples, at least the first cylindrical lens, the second cylindrical lens, and the third cylindrical lens are configured to expand the thermal infrared radiation in a plane of the first dimension. In one example, an anamorphic ratio of the expansion of the thermal infrared radiation between the first dimension and the second dimension is two. In a particular example, the first cylindrical lens is formed from silicon (Si), the second cylindrical lens is formed from Germanium (Ge), and the third cylindrical lens is formed from Silicon (Si), the second cylindrical lens being interposed between the first cylindrical lens and the third cylindrical lens.

According some examples, the first group of lenses includes a first lens formed from silicon (Si) and a second lens formed from zinc sulfide (ZnS). In various examples, the second group of lenses includes a third lens, a fourth lens, and a fifth lens each formed from a first material, and a sixth lens and a seventh lens each formed from a second material, the second group of lenses arranged so as to alternate between the lenses of the first material and the lenses of the second material. In at least one example, the first material is silicon (Si) and the second material is zinc sulfide (ZnS).

According to some examples, a ratio of a lens length and an effective focal length of the refractive objective lens assembly is 1.5. In at least one example, the refractive objective lens assembly further comprises an optical filter interposed between the cold stop and the relay lens group. According to certain examples, the optical filter is configured to pass thermal infrared radiation within the mid-wavelength infrared spectral band.

According to an aspect, provided is another refractive objective lens assembly. In one example, the refractive objective lens assembly comprises a passively athermal anamorphic lens group positioned to receive thermal infrared radiation and including a first cylindrical lens, a second cylindrical lens, and a third cylindrical lens each having a surface optically powered in a first dimension, the anamorphic lens group being configured to athermalize a first focal length of the refractive objective lens assembly in the first dimension, a focus cell positioned to receive the thermal infrared radiation from the anamorphic lens group and including a first group of lenses each having a rotationally symmetric surface optically powered in at least a second dimension orthogonal to the first dimension, the first group of lenses being configured to adjust the first focal length and a temperature sensitive second focal length of the refractive objective lens assembly in the second dimension, and a relay lens group positioned to receive the thermal infrared radiation from the focus cell, the relay lens group including a second group of lenses each having a rotationally symmetric surface optically powered in at least the second dimension.

According to various examples, the refractive objective lens assembly further comprises a fold mirror interposed between the focus cell and the relay lens group and positioned to direct the thermal infrared radiation from the focus cell to the relay lens group. In some examples, the refractive objective lens assembly further comprises a fourth cylindrical lens having a surface optically powered in the first dimension, the fourth cylindrical lens interposed between the fold mirror and the relay lens group. In certain examples, the first cylindrical lens is formed from silicon (Si), the second cylindrical lens is formed from Germanium (Ge), and the third cylindrical lens is formed from Silicon (Si), the second cylindrical lens being interposed between the first cylindrical lens and the third cylindrical lens.

In various examples, at least the first cylindrical lens, the second cylindrical lens, and the third cylindrical lens are configured to expand the thermal infrared radiation in a plane of the first dimension. In at least one example, an anamorphic ratio of the expansion of the thermal infrared radiation between the first dimension and the second dimension is two. In at least one example, a ratio of a lens length and an effective focal length of the refractive objective lens assembly is 1.5.

Still other aspects, embodiments, and advantages of these exemplary aspects and embodiments are discussed in detail below. Embodiments disclosed herein may be combined with other embodiments in any manner consistent with at least one of the principles disclosed herein, and references to "an embodiment," "some embodiments," "an alternate embodiment," "various embodiments," "one embodiment" or the like are not necessarily mutually exclusive and are intended to indicate that a particular feature, structure, or characteristic described may be included in at least one embodiment. The appearances of such terms herein are not necessarily all referring to the same embodiment. Various aspects and embodiments described herein may include means for performing any of the described methods or functions.

BRIEF DESCRIPTION OF THE DRAWINGS

Various aspects of at least one embodiment are discussed below with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. In the figures, each identical or nearly identical component that is illustrated in various figures is represented by a like numeral. For purposes of clarity, not every component may be labeled in every figure. In the figures.

DETAILED DESCRIPTION

Figure 1:
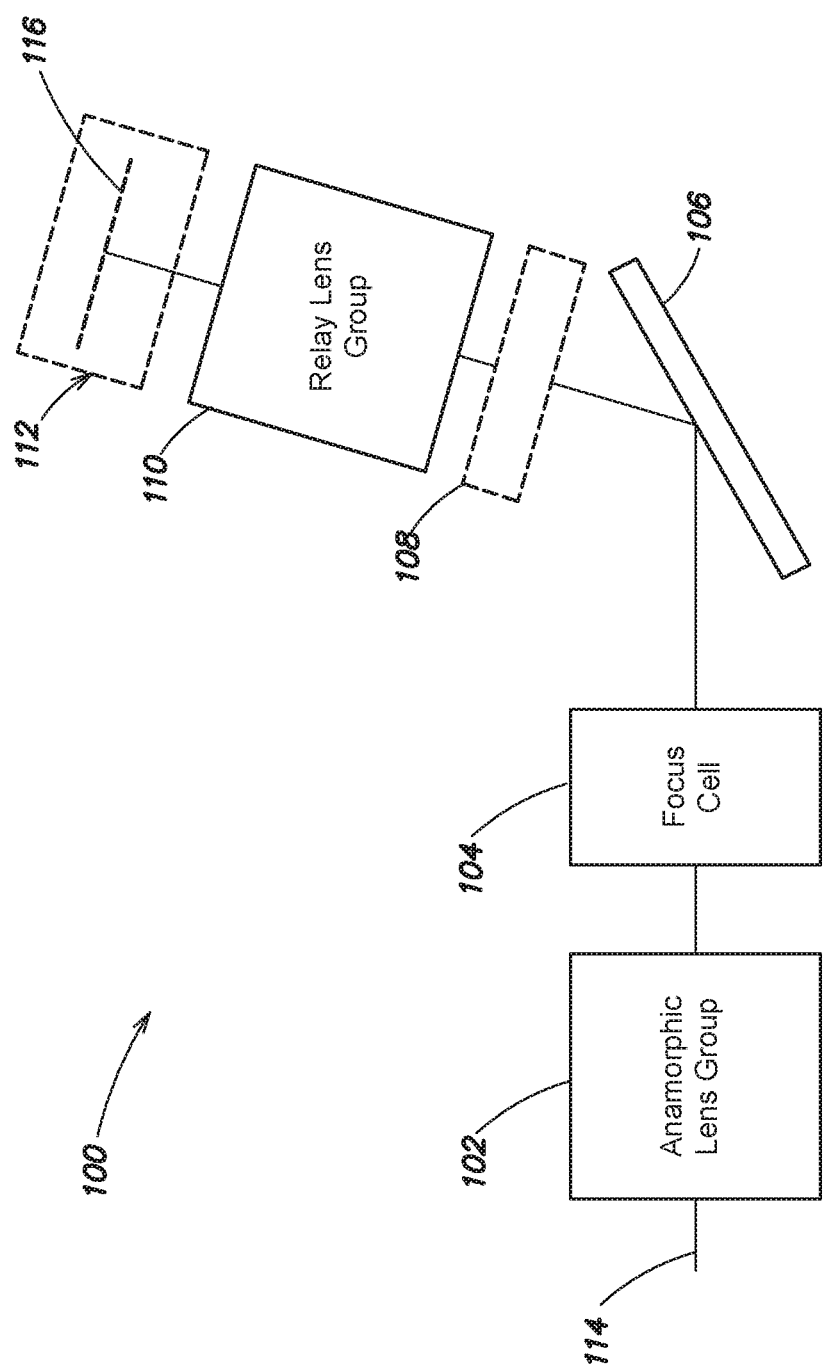
FIG. 1 is a block diagram of a refractive objective lens assembly according to one or more examples discussed herein.

Aspects and examples are generally directed to a compact anamorphic refractive objective lens assembly for thermal infrared imaging operations, such as imaging operations within the mid-wavelength infrared spectral band of the electromagnetic spectrum. According to certain examples, the refractive objective lens assembly described herein includes a passively athermal anamorphic lens group that maintains a focus of the objective lens assembly over a wide range of temperatures (e.g., −40° C. to +55° C.) and operating conditions. Moreover, examples of the compact anamorphic objective lens assembly described herein have a reduced total length for a given anamorphic ratio and a given focal length when compared to typical anamorphic lens assemblies. For instance, the objective lens assembly may have a ratio of a lens length to an effective focal length of as low as 1.5. As a result of the reduced size and weight, and improved temperature insensitivity, of the described objective lens assembly, examples may be incorporated within aerial and other mobile imaging systems that are designed to perform wide area surveillance (WAS) imaging.

In many aerial imaging applications, a field of view of an imaging system (e.g., a WAS imaging system) is projected at an angle slanted from altitude of the associated aerial platform. While this arrangement allows the imaging system to image "ahead" of the aerial platform, the projected slant often results in a distorted instantaneous field of view on the ground. That is, while an optical receiver of the imaging system may have a substantially square profile, the projected instantaneous field of view is distorted to a rectangular profile based on the angle of projection. While typical cinema projection lenses offer one potential solution to correcting the distorted field of view, current cinema projection lenses are too large and heavy to incorporate within most WAS imaging systems and are limited to operation within the visible portion of the electromagnetic spectrum. For instance, most cinema projection lenses include a simple afocal cylinder lens pair that more than doubles the length of the primary lens group and does not support high resolution imaging. To accommodate high resolution imaging, additional optics must be added, which further increases the size and weight of the lens assembly.

Accordingly, various aspects and examples of the compact anamorphic refractive objective lens assembly discussed herein offer an improved lens design with a reduced size and weight. Particular embodiments may be incorporated within imaging systems that have limited available space, such as WAS imaging systems. While discussed with reference to an aerial imaging system for the purpose of explanation, in various other examples the WAS imaging system may be designed for a ground platform, a maritime platform, a space platform, or any other mobile platform or vehicle.

It is to be appreciated that embodiments of the systems and apparatuses discussed herein are not limited in application to the details of construction and the arrangement of components set forth in the following description or illustrated in the accompanying drawings. The systems and apparatuses are capable of implementation in other embodiments and of being practiced or of being carried out in various ways. Examples of specific implementations are provided herein for illustrative purposes only and are not intended to be limiting. Also, the phraseology and terminology used herein is for the purpose of description and should not be regarded as limiting. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. Any references to front and back, left and right, top and bottom, upper and lower, and vertical and horizontal are intended for convenience of description, not to limit the present systems and methods or their components to any one positional or spatial orientation.

Referring to FIG. 1, illustrated is a block diagram of a compact anamorphic refractive objective lens assembly (refractive objective lens assembly) 100 according to at least one example. The refractive objective lens assembly 100 may include a passively athermal anamorphic lens group 102, a focus cell 104, a fold mirror 106, a relay lens group 110, and, in some instances, a dewar assembly 112. As further described herein, each of the anamorphic lens group 102, focus cell 104, relay lens group 110, and dewar assembly 112 may include one or more optical elements, such as one or more lenses that receive and direct thermal infrared radiation along an optical path 114. For example, the anamorphic lens group 102 may include one or more cylindrical lenses. In such an example, the refractive objective lens assembly 100 may also include one or more additional cylindrical lenses, such as the additional cylindrical lens 108 positioned along the optical path 114 between the fold mirror 106 and the relay lens group 110 in FIG. 1. Examples of the optical elements within the anamorphic lens group 102, focus cell 104, relay lens group 110, and dewar assembly 112 are further described below with reference to FIG. 2.

The anamorphic lens group 102 is positioned to receive thermal infrared radiation from a scene along the optical path 114 and direct the thermal infrared radiation to the focus cell 104. The focus cell 104 is positioned to receive the thermal infrared radiation from the anamorphic lens group 102 and direct the thermal infrared radiation to the fold mirror 106. The fold mirror 106 reflects the received thermal infrared radiation along the optical path 114 to the relay lens group 110. The relay lens group 110 is positioned along the optical path 114 to receive the thermal infrared radiation from the fold mirror 106 and direct the thermal infrared radiation along the optical path 114 to the dewar assembly 112. The dewar assembly 112 is positioned to receive the thermal infrared radiation along the optical path 114 and focus the infrared radiation at an optical detector 116 located therein.

In various examples, the anamorphic lens group 102, the focus cell 104, the fold mirror 106, the relay lens group 110, the additional cylindrical lens 108, and the dewar assembly 112 are supported within a housing (not shown). The housing surrounds and protects the components of the refractive objective lens assembly 100 from dirt, dust, moisture, and the like. The housing may include a window through which the anamorphic lens group 102 directly receives the thermal infrared radiation. However, in certain other examples one or more additional optics, such as a primary mirror and a secondary mirror may collect the thermal infrared radiation from a scene and direct the thermal infrared radiation to the anamorphic lens group 102. As discussed herein, thermal infrared radiation refers to electromagnetic radiation within the mid-wavelength infrared spectral band (e.g., 3 micrometers-8 micrometers) and long-wavelength infrared spectral band (e.g., 8 micrometers-15 micrometers). However, in particular examples the refractive objective lens assembly 100 may be optimized for just the mid-wavelength infrared spectral band or the long-wavelength infrared spectral band, or a portion thereof.

Figure 2:
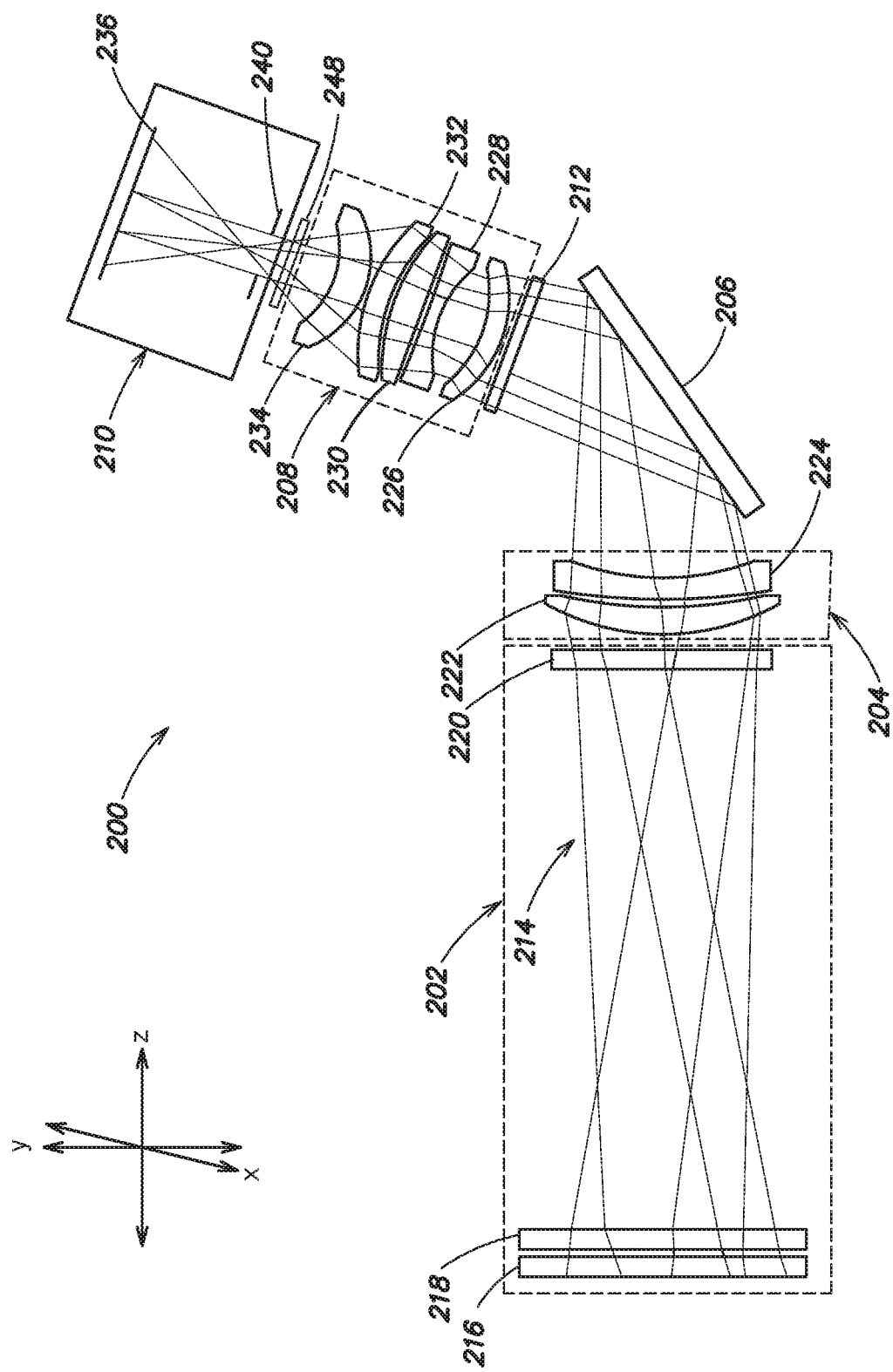
FIG. 2 is a ray trace diagram of a refractive objective lens assembly according to one or more examples discussed herein.

FIG. 2 depicts in greater detail one example of the components of a compact anamorphic refractive objective lens assembly (refractive objective lens assembly), such as the refractive objective lens assembly 100 illustrated in FIG. 1. In particular, FIG. 2 illustrates a first view of the optical elements of an anamorphic lens group 202, a focus cell 204, a relay lens group 208, and a dewar assembly 210. Each of the focus cell 204 and the relay lens group 208 may include a corresponding group of lenses. FIG. 2 illustrates the focus cell 204 having a first group of lenses each having a rotationally symmetric surface, and the relay lens group 208 having a second group of lenses each having a rotationally symmetric surface. As also illustrated in FIG. 2, the refractive objective lens assembly 200 may include a fold mirror 206 and one or more additional cylindrical lenses 212. Each of the anamorphic lens group 202, focus cell 204, fold mirror 206, additional cylindrical lens 212, relay lens group 208, and dewar assembly 210 may be positioned along an optical path to collectively receive and direct thermal infrared radiation. In FIG. 2, the thermal infrared radiation is illustrated by the ray traces 214.

The anamorphic lens group 202 may include one or more cylindrical lenses that have a surface optically powered in a first dimension (e.g., an x-direction). In FIG. 2, the anamorphic lens group 202 includes a first cylindrical lens 216, a second cylindrical lens 218, and a third cylindrical lens 220. Each cylindrical lens 216, 218, 220 has a receiving surface (e.g., a cylindrical surface) which is optically powered in a single dimension, such as the first dimension. FIG. 2 illustrates a view of the refractive objective lens assembly 200 from a second dimension (e.g., a y-direction) orthogonal to the first dimension, and, hence, does not illustrate the cylindrical surfaces of the cylindrical lenses 216, 218, 220. Each cylindrical lens 216, 218, 220 of the refractive objective lens assembly 200 includes a lens that substantially focuses or expands light in a plane of the first dimension. In particular, the cylindrical lenses 216, 218, 220 of the anamorphic lens group 202 may be arranged to asymmetrically "stretch" the received thermal infrared radiation to correct one or more distortions in an instantaneous field of view of the refractive objective lens assembly 200 that may result from imaging a scene at an angle.

Each of the first, second, and third cylindrical lens 216, 218, 220 are positioned along the optical path to receive and transmit the thermal infrared radiation. FIG. 1 illustrates the first cylindrical lens 216 receiving and directing the thermal infrared radiation to the second cylindrical lens 218. The second cylindrical lens 218 receives the thermal infrared radiation from the first cylindrical lens 216 and directs the thermal infrared radiation to the third cylindrical lens 220. The third cylindrical lens 220 receives the thermal infrared radiation from the second cylindrical lens 218 and directs the thermal infrared radiation to the focus cell 204.

In various examples, the anamorphic lens group 202 is passively athermalized due to the particular arrangement and material composition of the illustrated cylindrical lenses 216, 218, 220. That is, the anamorphic lens group 202 is insensitive to temperature fluctuations within the refractive objective lens assembly 200 and/or about the refractive objective lens assembly 200. In a particular example, the first cylindrical lens 216, the second cylindrical lens 218, and the third cylindrical lens 220 are positioned so as to fix a first focal length of the refractive objective lens assembly 200 in the dimension in which the first, second, and third cylindrical lenses 216, 218, 220 are optically powered (e.g., the first dimension). Each of the first cylindrical lens 216, the second cylindrical lens 218, and the third cylindrical lens 220 may be coupled to a corresponding bracket or support structure that immobilizes the corresponding cylindrical lens. As previously discussed, the first cylindrical lens 216, the second cylindrical lens 218, and the third cylindrical lens 220 influence (e.g., fix) the first focal length. In such an example, the first, second, and third cylindrical lenses 216, 218, 220 may be formed from materials that are inherently temperature insensitive, such as silicon (Si) or zinc sulfide (ZnS). For instance, the first cylindrical lens 216 may be formed from silicon (Si), the second lens 218 may be formed from zinc sulfide (ZnS), and the third cylindrical lens 220 may be formed from silicon (Si). However, in other examples, other materials that are transmissive to thermal infrared radiation and temperature insensitive may be used. Accordingly, in various examples the anamorphic lens group 202 athermalizes the first focal length of the refractive objective lens assembly 200.

As illustrated in FIG. 2, the third cylindrical lens 220 directs the thermal infrared radiation to the focus cell 204, and in particular, to a first group of lenses within the focus cell 204. Each lens within the first group of lenses may have a rotationally symmetric surface optically powered in the first dimension and the second dimension (e.g., the x-direction and the y-direction, respectively). In the illustrated example, the focus cell 204 includes a first lens 222 and a second lens 224 centered about the optical path. The first lens 222 and the second lens 224 may focus or expand the thermal infrared radiation in the plane corresponding to the first dimension and a plane corresponding to the second dimension. In various examples, the first group of lenses is configurable to adjust a focal length of the refractive objective lens assembly 200 in the first dimension and the second dimension (i.e., a second focal length). For instance, each of the first lens 222 and second lens 224 may be positioned on a corresponding gimbal assembly, or adjustable support system, that is controllable to displace the corresponding first or second lens 222, 224 to affect an increase or decrease in the first and second focal lengths of the refractive objective lens assembly 200. Unlike the first focal length, in some instances, the second focal length of the refractive objective lens assembly 200 may be sensitive to temperature changes. Accordingly, while the first focal length of the refractive objective lens assembly 200 may be adjusted by the anamorphic lens group 202, adjustments made to the lenses of the focus cell 204 may accommodate for impacts that temperature and/or operating conditions may have on the second focal length (and also the first focal length) of the refractive objective lens assembly 200. Lenses may be independently adjustable or adjustable as a group. In one example, the first lens 222 is formed from silicon (Si) and the second lens 224 formed from zinc sulfide (ZnS).

The second lens 224 of the focus cell 204 directs the thermal infrared radiation to the fold mirror 206. The fold mirror 206 is interposed between the focus cell 204 and the relay lens group 208 and positioned to direct the thermal infrared radiation from the focus cell 204 to the relay lens group 208. In particular, the fold mirror 206 may have a reflective surface that receives the thermal infrared radiation from the second lens 224 of the focus cell 204 and reflects the thermal infrared radiation to the relay lens group 208. As illustrated in FIG. 2, the fold mirror 206 may be centered along the optical path and positioned at a tilt relative to the optical path. In various examples, the fold mirror 206 may be advantageous to accommodate restrictive packaging constraints, such as those inside some WAS imaging systems (e.g., WAS imagining systems for unmanned aerial vehicles (UAVs)).

As illustrated in FIG. 2, in certain examples the refractive objective lens assembly 200 may include an additional cylindrical lens (e.g., the illustrated fourth cylindrical lens 212) interposed between the fold mirror 206 and the relay lens group 208. Similar to the first, second, and third cylindrical lenses 216, 218, 220 of the anamorphic lens group 202, the fourth cylindrical lens 212 has a surface optically powered in the first dimension, and may focus or expand light in the same plane as the first, second, and third cylindrical lenses 216, 218, 220. In particular, the fourth cylindrical lens 212 has a receiving surface (e.g., a cylindrical surface) that is optically powered in a single dimension, such as the first dimension. In one example, the fourth cylindrical lens 212 is formed from zinc sulfide (ZnS).

In the illustrated example, the fourth cylindrical lens 212 directs the thermal infrared radiation to the relay lens group 208. The relay lens group 208 may include a second group of lenses that each have a rotationally symmetric surface optically powered in the first dimension and the second dimension (e.g., the x-direction and the y-direction, respectively). In the illustrated example, the relay lens group 208 includes a third lens 226, a fourth lens 228, a fifth lens 230, a sixth lens 232, and a seventh lens 234 centered about the optical path. Each lens 226, 228, 230, 232, 234 may focus or expand the thermal infrared radiation in the plane corresponding to the first dimension and the plane corresponding to the second dimension. That is, in various examples, the second group of lenses is configurable to adjust the focal length of the refractive objective lens assembly 200 in the second dimension (i.e., the temperature sensitive second focal length) and the focal length of the refractive objective lens assembly 200 in the first dimension (i.e., the first focal length). For instance, each of the lenses 226, 228, 230, 232, 234 may be positioned on a corresponding gimbal assembly, or adjustable support system, that is controllable to displace the corresponding lens 226, 228, 230, 232, 234 to affect an increase or decrease in both focal lengths of the refractive objective lens assembly 200. The lenses 226, 228, 230, 232, 234 may be independently adjustable, adjustable in subgroups of the second group of lenses, or adjustable as a group.

Accordingly, while the first focal length of the refractive objective lens assembly 200 may be adjusted by the anamorphic lens group 202, adjustments made to the lenses 226, 228, 230, 232, 234 of the relay lens group 208 may accommodate for impacts that temperature and/or operating conditions may have on the first and second focal lengths of the refractive objective lens assembly 200. In certain examples, the third lens 226, the fifth lens 230, and the seventh lens 234 may each be formed from a first material, and the fourth lens 228 and the sixth lens 232 may each be formed from a second material. For instance, the first material may be silicon (Si) and the second material may be zinc sulfide (ZnS). In one example, the second group of lenses is arranged so as to alternate between the lenses of the first material and the lenses of the second material. That is, the third lens 226 may direct the thermal infrared radiation to the fourth lens 228. The fourth lens 228 may receive the infrared radiation from the third lens 226 and direct the infrared radiation to the fifth lens 230. The fifth lens 230 may receive the infrared radiation from the fourth lens 228 and direct the infrared radiation to the sixth lens 232. The sixth lens 232 may receive the infrared radiation from the fifth lens 230 and direct the infrared radiation to the seventh lens 234. As illustrated in FIG. 2, the seventh lens 234 may receive the infrared radiation from the sixth lens 232 and direct the infrared radiation to the dewar assembly 210.

The dewar assembly 210 is positioned to receive the thermal infrared radiation from the seventh lens 234 and direct the thermal infrared radiation to an optical detector 236. The dewar assembly 210 may include a dewar, a dewar window, a cold stop 240, and the optical detector 236. The dewar encloses (e.g., in a vacuum environment) the cold stop 240 and the optical detector 236, and protects the contents of the dewar from temperature fluctuations of the operating environment. The dewar window is positioned to receive the thermal infrared radiation and direct the thermal infrared radiation to the cold stop 240. The cold stop 240 limits the amount of thermal infrared radiation that reaches an image plane of the refractive objective lens assembly 200. For example, the cold stop 240 may be an edge of a fixture that holds a lens in place or an edge of a lens. Thermal infrared radiation that passes through the cold stop 240 is directed to the optical detector 236.

In various examples, the optical detector 236 is positioned at an image plane to receive and image the thermal infrared radiation. The optical detector 236 may include any photodetector sensitive to wavelengths within the thermal infrared spectrum or a subset of the thermal infrared spectrum, such as the mid-wavelength infrared spectral band or the long-wavelength infrared spectral band. For instance, the optical detector 236 may include an array of photo-sensitive detector elements (e.g., pixels) that receive and integrate impinging thermal infrared radiation. A circuit within each pixel of the optical detector 236 accumulates charge corresponding to the incident thermal infrared radiation. At the end of an integration period, each pixel may be deactivated, and a read-out signal may be provided based on the accumulated charge. The read-out signals may be used to generate and image based on the received thermal infrared radiation. In various embodiments, the array of detector elements may include infrared detector materials such as indium gallium arsenide (InGaAs) or mercury cadmium telluride (HgCaTe), to name a few examples.

As further illustrated in FIG. 2, in certain instances the refractive objective lens assembly 200 may also include one or more optical filters 248. FIG. 2 illustrates the refractive objective lens assembly 200 including an optical filter 248 interposed between the relay lens group 208 and the dewar assembly 210. However, in certain other examples, the optical filter 248 may be positioned within the dewar assembly 210. In various examples, the optical filter 248 may transmit a selected spectral band of the received thermal infrared radiation, and reject a remaining portion thereof. For instance, the optical filter may pass thermal infrared radiation within the mid-wavelength spectral band, or a portion thereof (e.g., 3.0-5.0 microns), and reject (e.g., absorb and/or reflect) other portions of the electromagnetic spectrum. In such an example, the optical filter 248 may be formed from germanium (Ge).

Figure 3:
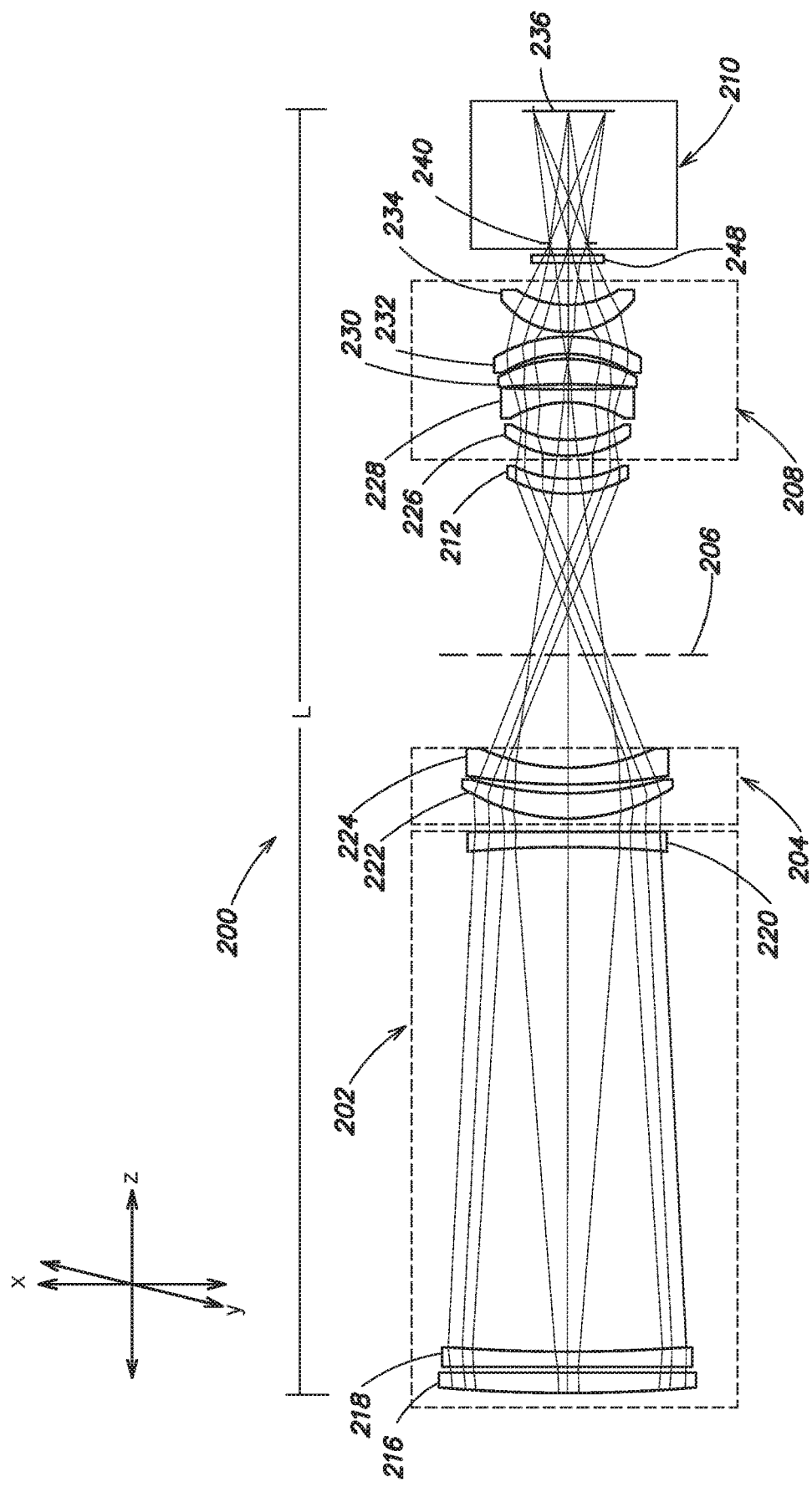
FIG. 3 is an unfolded view of the refractive objective lens assembly illustrated in FIG. 2, in a first dimension, according to one or more examples discussed herein.
Figure 4:
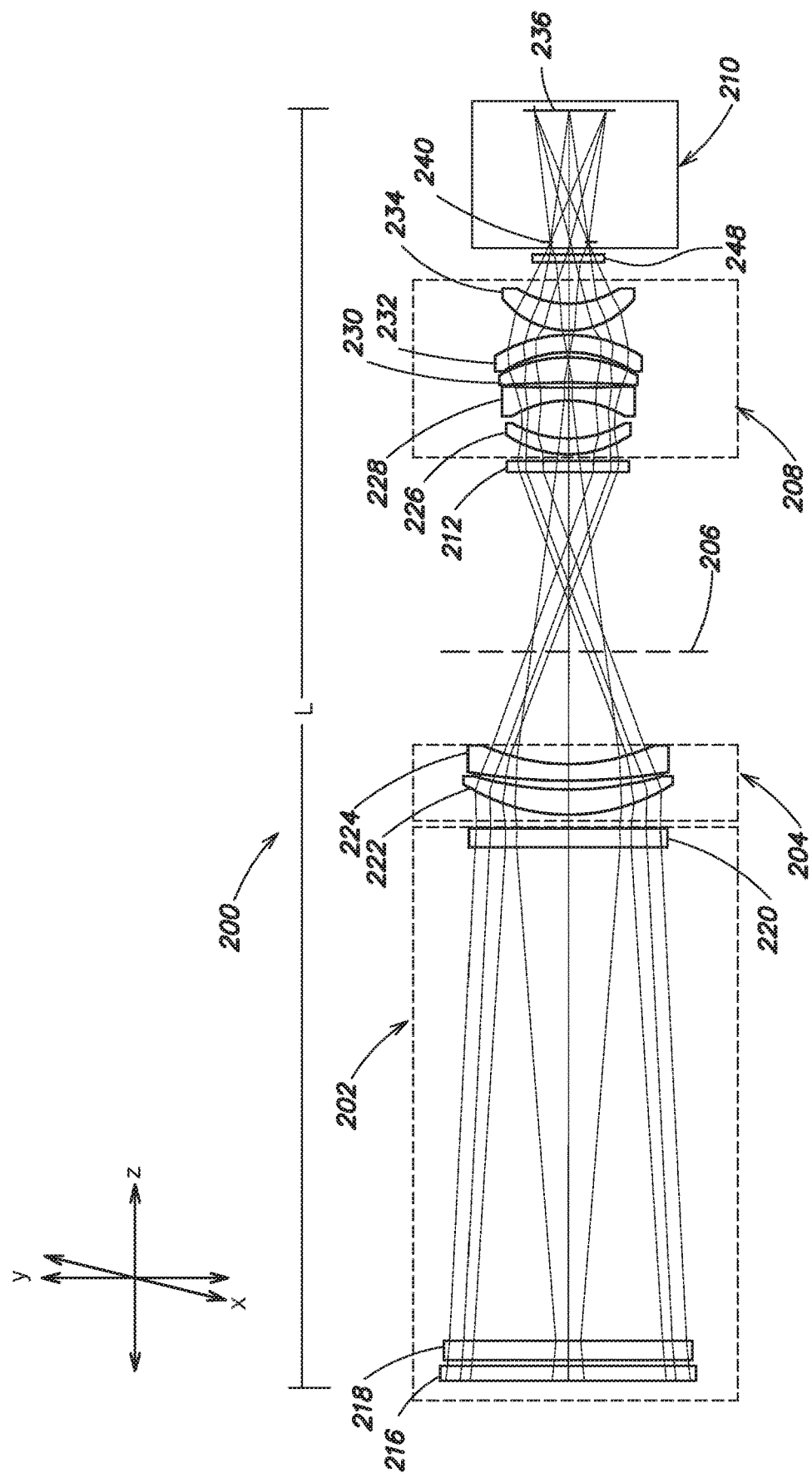
FIG. 4 is an unfolded view of the refractive objective lens assembly illustrated in FIG. 2, in a second dimension, according to one or more examples discussed herein.

Referring to FIG. 3 and FIG. 4, illustrated are unfolded views of the refractive objective lens assembly 200 illustrated in FIG. 2. FIG. 3 illustrates an unfolded view of the refractive objective lens assembly 200 in the first dimension (e.g., x-direction) and FIG. 4 illustrates an unfolded view of the refractive objective lens 200 assembly in the second dimension (e.g., y-direction). As discussed above with reference to at least FIG. 2, in various examples the first, second, third, and fourth cylindrical lenses 216, 218, 220, 212 each have a surface optically powered in the first dimension, and may focus or expand light in the plane of the first dimension. In particular, the cylindrical lenses 216, 218, 220, 212 may have a receiving surface (e.g., a cylindrical surface) that is optically powered in the first dimension. FIG. 3 illustrates the cylindrical surfaces of the cylindrical lenses 216, 218, 220, 212 and the optical power thereof in the first dimension. As further shown in FIG. 3, each of the lenses 222, 224, 226, 228, 230, 232, 234 have a rotationally symmetric surface that is optically powered in the first dimension. Compared with FIG. 3, FIG. 4 illustrates that the cylindrical lenses 216, 218, 220, 212 produce no beam convergence or divergence in the plane of the second dimension. That is, the anamorphic lens group 202 has no focal power in the second dimension. FIG. 4 further illustrates the rotationally symmetric surfaces of the lenses 222, 224, 226, 228, 230, 232, 234, and the optical power thereof in both dimensions.

In particular examples, the optical elements of the refractive objective lens assembly 200 are arranged to achieve an anamorphic ratio of two between the expansion of light within the first dimension and the expansion of light within the second dimension (e.g., expansion of light within the first dimension divided by the expansion of light within the second dimension). For example, when combined, each of the first, second, third, and fourth cylindrical lens 216, 218, 220, 212, as well as the other optical elements of the refractive objective lens assembly 200, may expand the received thermal infrared radiation substantially more in one dimension than in the other dimension. In one example, this may include adjusting the focal length twice as much in the first dimension (e.g., x-direction) as in the second dimension (e.g., y-direction), while in other examples it may include adjusting the focal length twice as much in the second dimension as in the first dimension. While an anamorphic ratio of two is described as one example, it is appreciated that in various other examples the optical elements of the refractive objective lens assembly 200 may be arranged to achieve other anamorphic ratios, such as from about 1 to 2.2 (±0.1 or 0.2). TABLE 1 provides examples of surface data for an optical prescription of an example of a refractive objective lens assembly that may be used to achieve an anamorphic ratio of two, for example.

As discussed above, various examples of the refractive objective lens assembly 200 described herein have a reduced total length for a given anamorphic ratio and a given focal length when compared to typical anamorphic lens assemblies. For example, a ratio of length and effective focal length (L/EFL) of the refractive objective lens assembly 200 may be significantly less than most cinematic projection lenses, making the refractive objective lens assembly 200 easier to incorporate within WAS imaging systems. In one example, the ratio of lens length (shown in FIGS. 3 and 4 as "L") to effective focal length is at most 1.5, and may, in some instances, be less than 1.5.

TABLE 1 below provides surface data for an optical prescription for an example of the refractive objective lens assembly 200 illustrated in FIG. 2. The optical prescription for this example of the refractive objective lens assembly 200 may be generated using an equation which is an industry standard and which would be known to those skilled in the art. However, it is to be appreciated that the prescription given in TABLE 1 is merely exemplary, and that the prescriptions of various examples of the refractive objective lens assembly 200 are determined by the intended imaging task to be performed by the refractive objective lens assembly 200. Specifically, TABLE 1 provides a lens type, radius "Rad." (in inches), separation "Sep." (in inches), refractive "Ref." index, and Asphere "Asph." coefficient (order and value) for each surface of the optical elements within the objective lens assembly 200. The respective front and back surface of each optical element are also indicated in TABLE 1. Within TABLE 1, the "front" surface refers to the surface at which the thermal infrared radiation is received, and the "back" surface refers to the surface from which the thermal infrared radiation is transmitted.

tive objective lens assembly, examples may be incorporated within platforms in which available space is limited and weight is a significant design factor.

Having described above several aspects of at least one example, it is to be appreciated that various alterations, modifications, and improvements will readily occur to those skilled in the art. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

TABLE 1

| Surface | Type | Rad. | Sep. | Material | Ref. Index | Asph. Coef. | Asph. Coef. |
|---|---|---|---|---|---|---|---|
| 1 (front) | Cylinder | 14.325 | 0.1500 | silicon | 3.42 | | |
| 1 (back) | Cylinder | plane | 0.0500 | air | | | |
| 2 (front) | Cylinder | plane | 0.1500 | germanium | 4.01 | | |
| 2 (back) | Cylinder | 66.794 | 4.1027 | air | | | |
| 3 (front) | Cylinder | −9.430 | 0.1500 | silicon | 3.42 | | |
| 3 (back) | Cylinder | plane | 0.1000 | air | | | |
| 4 (front) | | 1.648 | 0.2000 | silicon | 3.42 | | |
| 4 (back) | Asphere | 3.039 | 0.0649 | air | | 4th order | 0.0063 |
| 5 (front) | | 4.927 | 0.1500 | zinc sulfide | 2.25 | | |
| 5 (back) | | 1.899 | 1.4000 | air | | | |
| Fold Mirror | | plane | 0.4500 | air | | | |
| | | plane | 0.5106 | air | | | |
| 6 (front) | Cylinder | 1.130 | 0.1249 | zinc sulfide | 2.25 | | |
| 6 (back) | Cylinder | 1.076 | 0.0250 | air | | | |
| 7 (front) | Asphere | 0.903 | 0.1500 | silicon | 3.42 | 4th order | 0.0246 |
| | | | | | | 6th order | −0.1203 |
| | | | | | | 8th order | 0.2263 |
| 7 (back) | | 0.903 | 0.3273 | air | | | |
| 8 (front) | | −0.850 | 0.1000 | zinc sulfide | 2.25 | | |
| 8 (back) | | 10.000 | 0.0519 | air | | | |
| 9 (front) | | −6.630 | 0.2000 | silicon | 3.42 | | |
| 9 (back) | Asphere | −1.146 | 0.0400 | air | | 4th order | 0.1609 |
| | | | | | | 6th order | −0.0566 |
| 10 (front) | | −1.078 | 0.1500 | zinc sulfide | 2.25 | | |
| 10 (back) | Asphere | −1.268 | 0.0400 | air | | 4th order | −0.1732 |
| | | | | | | 6th order | 0.0750 |
| 11 (front) | | 0.700 | 0.2037 | silicon | 3.42 | | |
| 11 (back) | Asphere | 0.701 | 0.4500 | air | | 4th order | 0.0117 |
| | | | | | | 6th order | 0.3488 |
| 12 (front) | | plane | 0.0400 | germanium | 4.01 | | |
| 12 (back) | | plane | 0.0390 | air | | | |
| STOP | | plane | 0.0000 | air | | | |
| | | plane | 0.9940 | air | | | |
| Detector | | plane | 0.0000 | air | | | |

As such, aspects and examples described herein provide a compact anamorphic refractive objective lens assembly for imaging within the thermal infrared spectrum. In particular, examples of the refractive objective lens assembly described herein have a reduced total length for a given anamorphic ratio and a given focal length when compared to typical anamorphic lens assemblies. Moreover, as further discussed herein, the refractive objective lens assembly may have a ratio of a lens length to an effective focal length of as low as 1.5. As a result of the reduced size and weight, and improved temperature insensitivity, of the described refrac-

What is claimed is:

1. A refractive objective lens assembly comprising:

a passively athermal anamorphic lens group positioned to receive thermal infrared radiation and including a first cylindrical lens, a second cylindrical lens, and a third cylindrical lens each having a surface optically powered in a first dimension, the anamorphic lens group being configured to athermalize a first focal length of the refractive objective lens assembly in the first dimension;

a focus cell positioned to receive the thermal infrared radiation from the anamorphic lens group and including a first group of lenses each having a rotationally symmetric surface optically powered in at least a second dimension orthogonal to the first dimension, the first group of lenses being configured to adjust the first focal length and a temperature sensitive second focal length of the refractive objective lens assembly in the second dimension; and a relay lens group positioned to receive the thermal infrared radiation from the focus cell, the relay lens group including a second group of lenses each having a rotationally symmetric surface optically powered in at least the second dimension, wherein the second group of lenses includes a third lens, a fourth lens, and a fifth lens each formed from a first material, and a sixth lens and a seventh lens each formed from a second material, the second group of lenses arranged so as to alternate between the lenses of the first material and the lenses of the second material.

2. The refractive objective lens assembly of claim 1, further comprising a fold mirror interposed between the focus cell and the relay lens group and positioned to direct the thermal infrared radiation from the focus cell to the relay lens group.

3. The refractive objective lens assembly of claim 2, further comprising a fourth cylindrical lens having a surface optically powered in the first dimension, the fourth cylindrical lens interposed between the fold mirror and the relay lens group.

4. The refractive objective lens assembly of claim 3, wherein the first cylindrical lens is formed from silicon (Si), the second cylindrical lens is formed from Germanium (Ge), and the third cylindrical lens is formed from Silicon (Si), the second cylindrical lens being interposed between the first cylindrical lens and the third cylindrical lens.

5. The refractive objective lens assembly of claim 1, wherein at least the first cylindrical lens, the second cylindrical lens, and the third cylindrical lens are configured to expand the thermal infrared radiation in a plane of the first dimension.

6. The refractive objective lens assembly of claim 5, wherein an anamorphic ratio of the expansion of the thermal infrared radiation between the first dimension and the second dimension is two.

7. The refractive objective lens assembly of claim 1, wherein a ratio of a lens length and an effective focal length of the refractive objective lens assembly is 1.5.

* * * * *